(12) United States Patent  (10) Patent No.: US 9,350,914 B1
Kaur et al.  (45) Date of Patent: May 24, 2016

(54) METHODS OF ENFORCING PRIVACY REQUESTS IN IMAGING SYSTEMS

(71) Applicant: SEMICONDUCTOR COMPONENTS INDUSTRIES, LLC, Phoenix, AZ (US)

(72) Inventors: Balwinder Kaur, Fremont, CA (US); Brian Keelan, Boulder Creek, CA (US); Richard Mauritzson, Meridian, ID (US); Marko Mlinar, Horjul (SI)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/620,030

(22) Filed: Feb. 11, 2015

(51) Int. Cl.
   *H04N 5/228* (2006.01)
   *H04N 5/232* (2006.01)
   *G06K 9/00* (2006.01)
   *G06K 9/62* (2006.01)
   *G06T 5/00* (2006.01)

(52) U.S. Cl.
   CPC ........ *H04N 5/23229* (2013.01); *G06K 9/00228* (2013.01); *G06K 9/00791* (2013.01); *G06K 9/62* (2013.01); *G06T 5/002* (2013.01); *G06T 2207/10004* (2013.01); *G06T 2207/20172* (2013.01); *G06T 2207/30204* (2013.01); *G06T 2207/30232* (2013.01)

(58) Field of Classification Search
   None
   See application file for complete search history.

(56) References Cited

U.S. PATENT DOCUMENTS

| | | | |
|---|---|---|---|
| 2005/0152579 A1 | 7/2005 | Park et al. | |
| 2006/0198559 A1* | 9/2006 | Manico | G03D 15/003 382/305 |
| 2007/0216775 A1* | 9/2007 | Yokota | H04N 1/00127 348/222.1 |
| 2008/0093468 A1* | 4/2008 | Fan | B42D 25/29 235/494 |
| 2009/0193055 A1 | 7/2009 | Kuberka et al. | |
| 2013/0262333 A1* | 10/2013 | Wicker | G06Q 10/00 705/325 |

* cited by examiner

*Primary Examiner* — Roberto Velez
*Assistant Examiner* — Stephen Coleman
(74) *Attorney, Agent, or Firm* — Treyz Law Group, P.C.; Joseph F. Guihan

(57) ABSTRACT

An imaging system may capture image data and use the captured image data to detect a privacy request. Depending on the specific privacy request, the imaging system may delete or blur the captured image to comply with the detected privacy request. The imaging system may use face recognition software and only blur faces that are present in the captured image, leaving the rest of the image unobscured. The imaging system may only comply with the privacy request if the imaging system is in a predetermined area or within a predetermined distance of a privacy seeking external device. The imaging system may be disabled if the system enters a geofenced area that restricts the capture of images. The imaging system may recognize a given temporal pattern of light as a privacy request and modify any captured images accordingly.

21 Claims, 10 Drawing Sheets

METHODS OF ENFORCING PRIVACY REQUESTS IN IMAGING SYSTEMS

BACKGROUND

This relates generally to imaging systems and, more particularly, to imaging systems enforcing privacy requests.

Modern technology has seen an increased implementation of imaging systems in electronic devices. Mobile devices such as cellular telephones, PDAs, tablets, and computers are increasingly made to include imaging systems such as cameras so that a user of the mobile device can conveniently take photographs of their surroundings.

As camera enabled personal devices become more common, the protocol of requesting permission before taking photos is dwindling. Moreover, camera enabled personal devices commonly have the ability to instantly upload pictures to social networking sites. Consequently, privacy violations are becoming commonplace.

It would therefore be desirable to provide imaging systems with improved capabilities of enforcing privacy by complying with privacy requests of the people and places around them.

DETAILED DESCRIPTION

Imaging systems having digital camera modules are widely used in electronic devices such as digital cameras, computers, cellular telephones, and other electronic devices. A digital camera module may include one or more image sensors that gather incoming light to capture an image. Image data captured by an image sensor may be processed after capture. The processed data may then be used by an associated electronic device to display the captured image.

In certain circumstances, it may be desirable for an imaging system to throw away or modify captured image data before performing image processing. For example, the imaging system may capture an image of a person or place that has made a privacy request. Upon recognizing the privacy request, the imaging system may take action to modify or delete portions or all of the captured image data in order to protect the privacy of the requestor.

Figure 1:
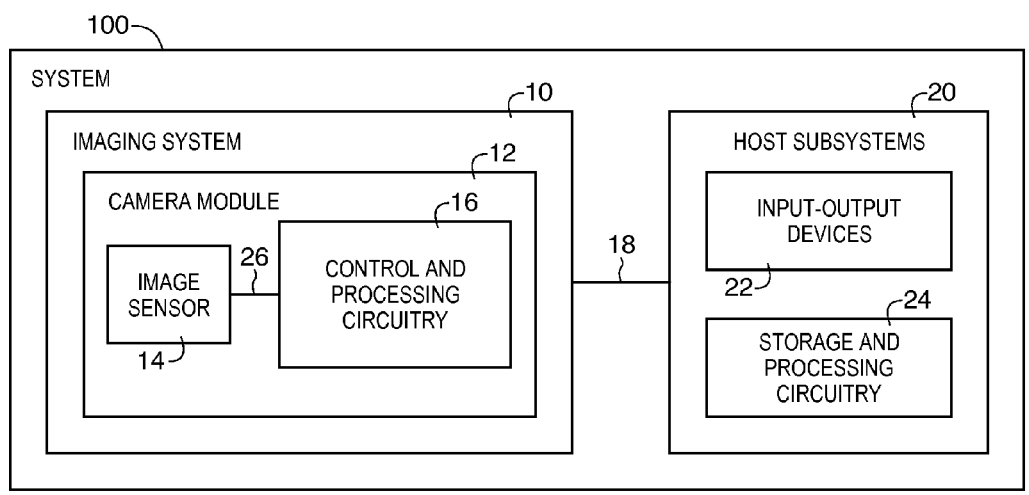
FIG. 1 is a diagram of an illustrative system such as an electronic device that includes an imaging system and a host subsystem in accordance with an embodiment of the present invention.

FIG. 1 is a diagram of an illustrative system having an imaging system that uses an image sensor to capture images and a corresponding host subsystem. System 100 of FIG. 1 may, for example, be an electronic device such as a cellular telephone, tablet, laptop computer, PDA, or any other desired electronic device.

As shown in FIG. 1, system 100 may include an imaging system such as imaging system 10 and host subsystems such as host subsystem 20. Imaging system 10 may include camera module 12. Camera module 12 may include one or more image sensors 14 and one or more corresponding lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to control and processing circuitry 16 via path 26. Control and processing circuitry 16 may be used to perform image processing functions such as data formatting, adjusting white balance and exposure, implementing video image stabilization, face detection, etc. Control and processing circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and control and processing circuitry 16 are implemented on a common semiconductor substrate (e.g., a common silicon image sensor integrated circuit die). If desired, camera sensor 14 and processing circuitry 16 may be formed on separate semiconductor substrates. For example, camera sensor 14 and processing circuitry 16 may be formed on separate substrates that have been stacked.

Imaging system 10 may convey acquired image data to host subsystem 20 over path 18. Host subsystem 20 may include processing software for detecting objects in images, detecting motion of objects between image frames, determining distances to objects in images, detecting faces in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
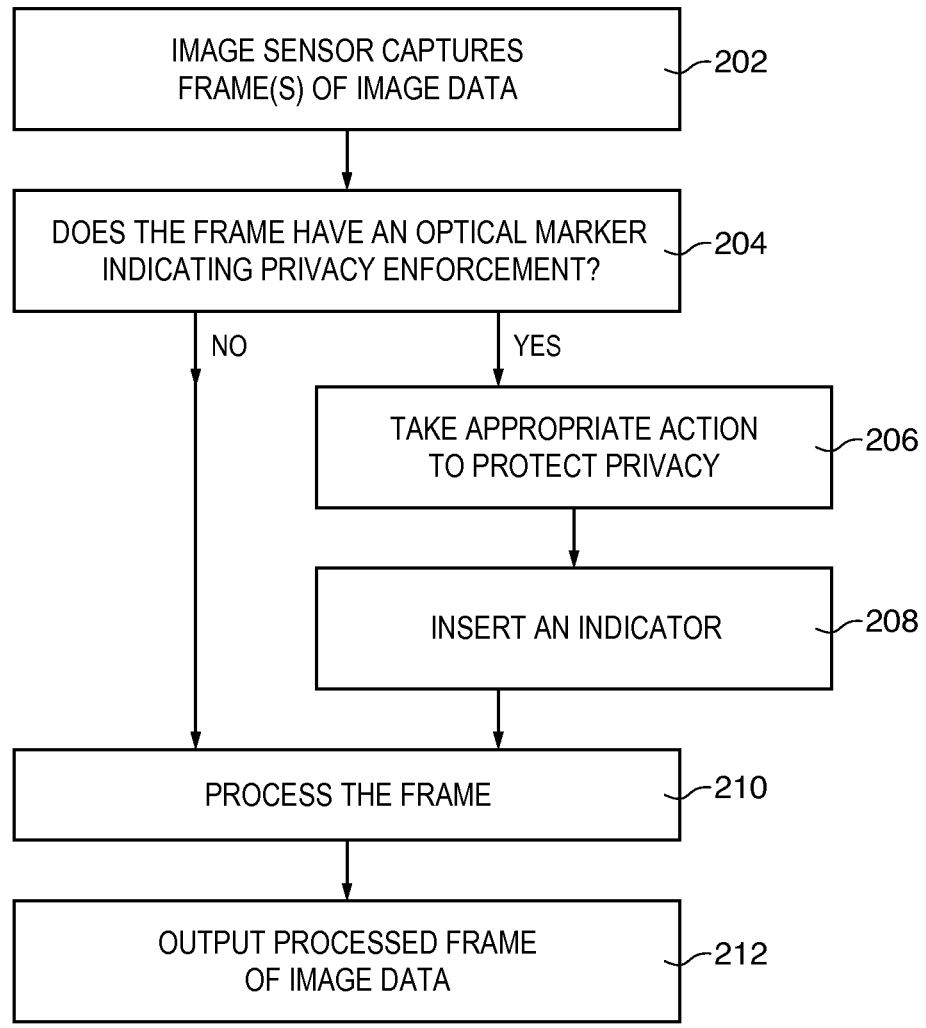
FIG. 2 is a flowchart of illustrative steps for enforcing privacy requests using an optical marker in accordance with an embodiment of the present invention.

FIG. 2 is a flowchart of illustrative steps for enforcing privacy requests using an optical marker. At step 202, an image sensor such as image sensor 14 may capture a frame or multiple frames of image data. In an illustrative example, image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 204, the imaging system may determine if the image captured by image sensor 14 contains an optical marker indicating a privacy request. For example, control and processing circuitry 16 may analyze the image data to search for an optical marker before other image processing occurs. If no optical marker indicative of a privacy request is determined to be present, the image data may be processed at step 210. If an optical marker indicative of a privacy request is determined to be present, appropriate action may be taken to protect privacy at step 206.

Figure 5:
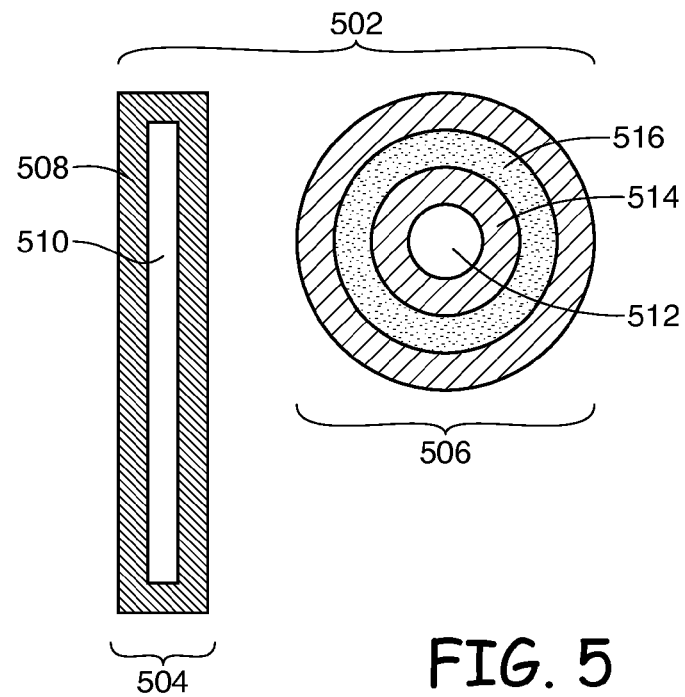
FIG. 5 is a diagram of an illustrative optical marker for use in privacy request enforcement in accordance with an embodiment of the present invention.

The optical marker may comprise a pattern of colors and shapes, as shown in FIG. 5. The optical marker may, for example, be placed on a person who does not want their photograph to be captured. A requesting individual may place the optical marker on their clothes or an accessory such as a bag or purse. In general, the optical marker may be placed at any suitable location on a person who wishes to maintain their privacy. The optical marker may also be used to protect the privacy of an object or venue. For example, if the owner of a house wished to prevent photographs being taken of their house, the owner may place the optical marker on their house. This example is purely illustrative, and the privacy of any object may be maintained with the optical marker. A car, boat, motorcycle, painting, statue, or pet may all be protected using the optical marker. In another example, the optical marker may be used to maintain the privacy of a location, building, or venue. For example, a hospital, museum, school, or other institution wishing to prevent unauthorized photographs may place the optical markers throughout the venue. In general, the optical marker may be used to prevent photographs being taken of any person, object, building, or venue that wishes to be protected.

At step 206, after an optical marker indicative of a privacy request is detected, the imaging system may take appropriate action to protect privacy. Control and processing circuitry 16 may, for example, delete the frame of captured image data entirely. Alternatively, control and processing circuitry 16 may use blurring techniques to blur the captured image. In these cases, the image would be blurred so that the image is unrecognizable, thus sufficiently protecting the privacy of the subject of the image.

At step 208, after taking action to protect privacy, control and processing circuitry 16 may insert an indicator. The indicator may explain that a privacy marker was detected in the originally captured image and that the image has been deleted or altered accordingly. In embodiments where the frame is deleted entirely, the indicator may include text that clarifies that the frame was deleted for privacy protection. In embodiments where the frame is blurred, the indicator may include text that clarifies that the frame was blurred for privacy protection. In certain embodiments, the indicator may be a symbol instead of text. Any suitable indicator may be used to convey the information to the user of the system. In certain embodiments, the original image data may also be thrown away at step 208. This ensures that the image data cannot be obtained and processed to violate the privacy of the subject in the image.

At step 210, the frame of captured image data may be processed by control and processing circuitry 16. This processing may convert the image data into an image suitable for use in a display.

At step 212, the processed frame of image data may be exported. For example, the image data may be output to a host-subsystem such as host-subsystem 20. Once at host-subsystem 20, system 100 may use input-output devices 22 such as a display to display the captured image. In frames where privacy enforcement was necessary, the display may display the altered frame with the indicator inserted at step 208.

Figure 3:
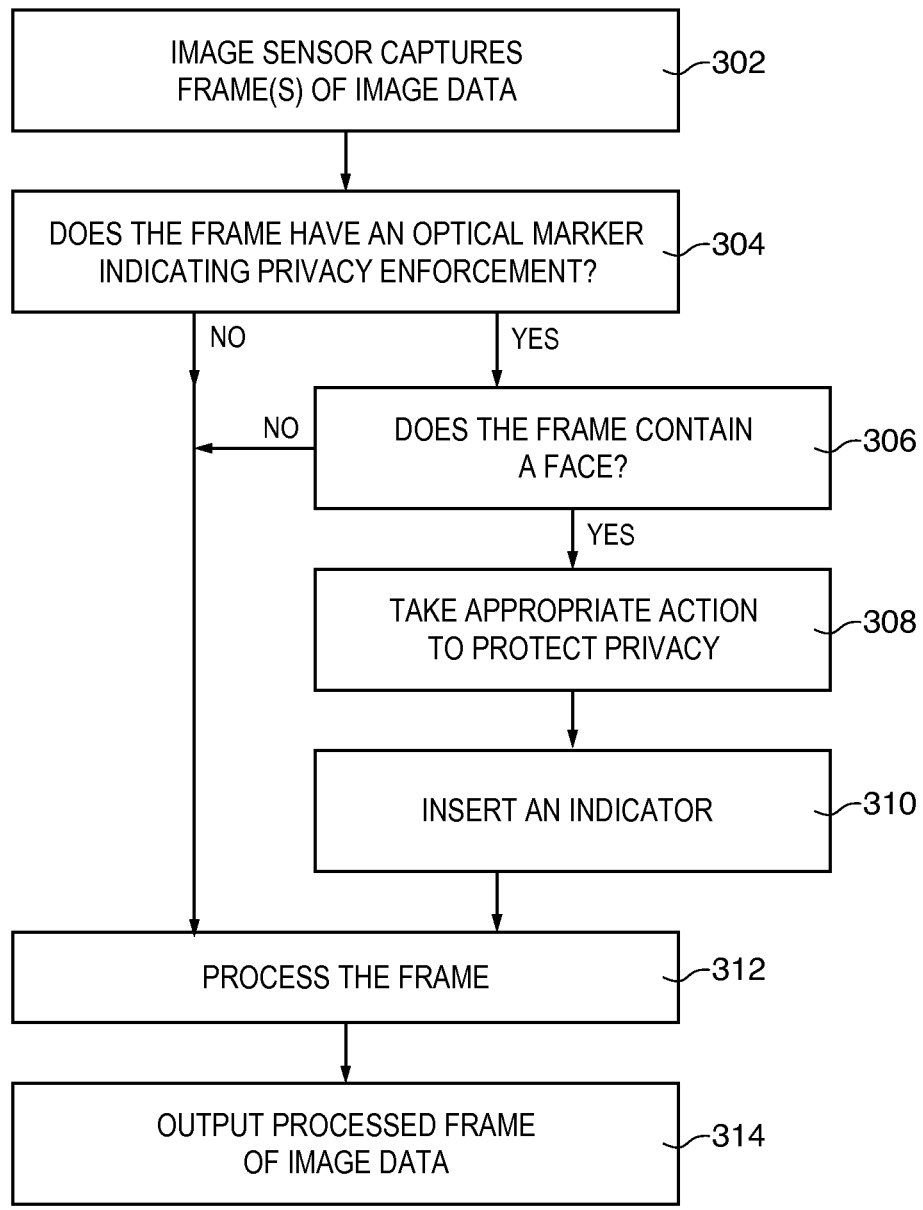
FIG. 3 is a flowchart of illustrative steps for enforcing privacy requests using an optical marker and face recognition in accordance with an embodiment of the present invention.

FIG. 3 is a flowchart of illustrative steps for enforcing privacy requests using an optical marker and face recognition. At step 302, an image sensor such as image sensor 14 may capture a frame or multiple frames of image data. In an illustrative example, image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 304, the system may determine if the image captured by image sensor 14 contains an optical marker indicating privacy enforcement. Control and processing circuitry 16 may analyze the image data to search for an optical marker before other image processing occurs. If no optical marker indicative of privacy enforcement is present, the image data may be processed at step 312. If an optical marker indicative of privacy enforcement is present, face recognition may be performed at step 306.

At step 306, the imaging system may determine if there is a person's face present in the captured image. If there is no face present in the captured image, the image data may be processed at step 312. If there is a face present, appropriate action may be taken to protect privacy at step 308.

At step 308, after an optical marker indicative of privacy enforcement and a person's face are detected, the system may take appropriate action to protect privacy. Control and processing circuitry 16 may, for example, delete the frame of captured image data entirely. Alternatively, control and processing circuitry 16 may use blurring techniques to blur the entire captured image. In these cases, the image would be blurred so that the image is unrecognizable, thus sufficiently protecting the privacy of the subject of the image. In another embodiment, control and processing circuitry 16 may use blurring techniques to blur only the faces present in the captured image. This may allow the rest of the image to be viewable while still maintaining the privacy of the subjects of the photograph or video. In yet another embodiment, control and processing circuitry 16 may overlay a solid color over the faces in the captured image. Similar to blurring only the faces in the image, this technique may allow the rest of the image to be viewable while still maintaining the privacy of the subjects of the photograph or video. In general, any desired method of preventing faces in the captured image from being recognized may be used to protect the privacy of the individuals in the photograph. In certain embodiments, only faces associated with the optical marker may be obscured. For example, if an individual was wearing a piece of clothing with an optical marker indicative of privacy enforcement, only their face may be blurred.

At step 310, after taking action to protect privacy, control and processing circuitry 16 may insert an indicator. The indicator may explain that a privacy marker was detected in the originally captured image and that the image or portions of the image have been deleted or altered accordingly. In embodiments where the frame is deleted entirely, the indicator may include text that clarifies that the frame was deleted for privacy protection. In embodiments where the frame is blurred, the indicator may include text that clarifies that the frame was blurred for privacy protection. In embodiments where only the faces in the photograph are altered, either through blurring techniques, a solid color overlay, or another technique, the indicator may include text that clarifies that the faces of individuals in the photograph are being obscured for privacy protection. In certain embodiments, the indicator may be a symbol instead of text. Any desired indicator may be used to convey the information to the user of the system. In certain embodiments, the original image data may also be thrown away at step 310. This ensures that the image data cannot be obtained and processed to violate the privacy of the subject in the image.

At step 312, the frame of captured image data may be processed by control and processing circuitry 16. This processing may convert the image data into an image suitable for use in a display.

At step 314, the processed frame of image data may be exported. For example, the image data may be output to a host-subsystem such as host-subsystem 20. Once at host-subsystem 20, system 100 may use input-output devices 22 such as a display to display the captured image. In frames where privacy enforcement was necessary, the display may display the altered frame with the indicator inserted at step 310.

Figure 4:
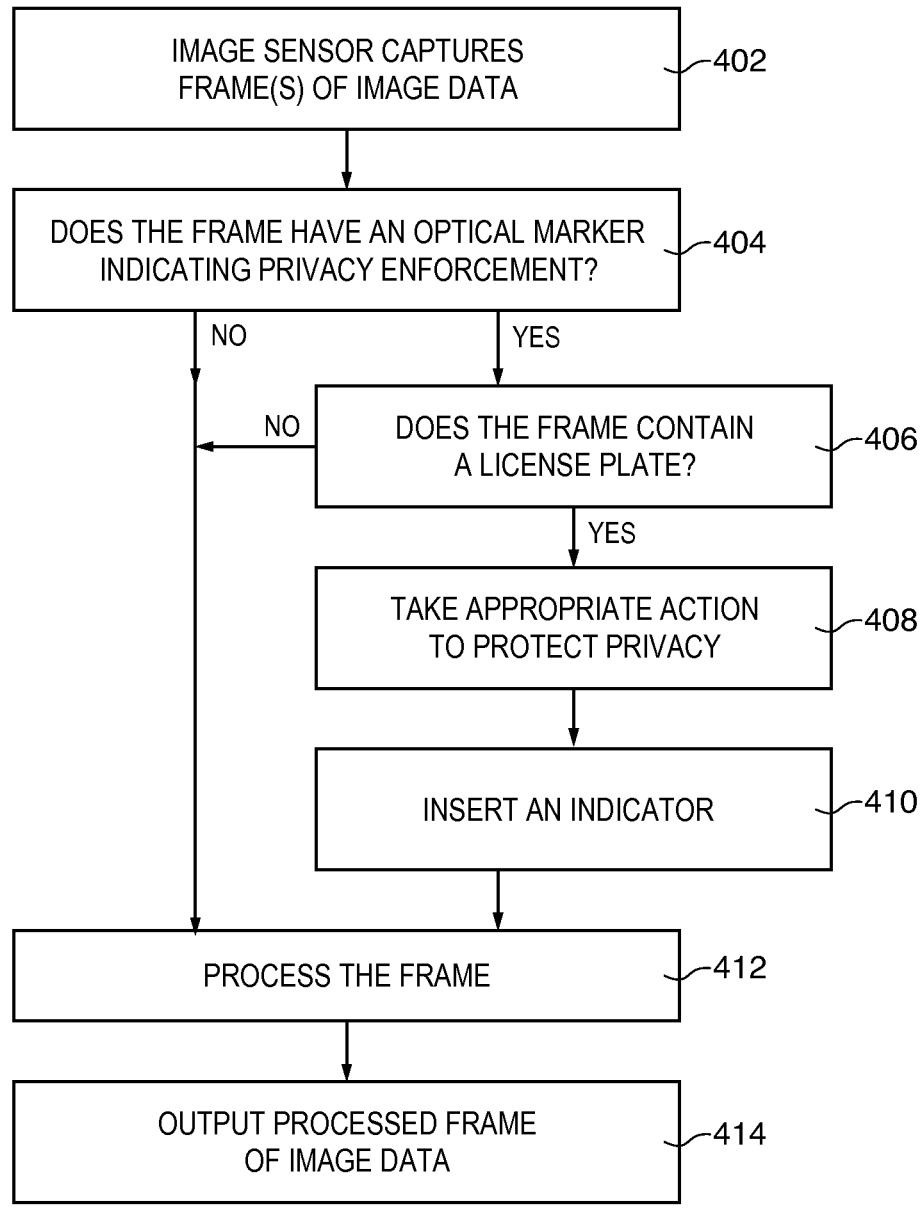
FIG. 4 is a flowchart of illustrative steps for enforcing privacy requests using an optical marker on a license plate in accordance with an embodiment of the present invention.

FIG. 4 is a flowchart of illustrative steps for enforcing privacy requests using an optical marker and license plate recognition. At step 402, an image sensor such as image sensor 14 may capture a frame or multiple frames of image data. In an illustrative example, image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 404, the system may determine if the image captured by image sensor 14 contains an optical marker indicating privacy enforcement. Control and processing circuitry 16 may analyze the image data to search for an optical marker before other image processing occurs. If no optical marker indicative of privacy enforcement is present, the image data may be processed at step 412. If an optical marker indicative of privacy enforcement is present, the image may be analyzed for the presence of a license plate at step 406.

At step 406, control and processing circuitry 16 may determine if there is a license plate present in the captured image. If there is no license plate present in the captured image, the image data may be processed at step 412. If there is a license plate present, appropriate action may be taken to protect privacy at step 408.

At step 408, after an optical marker indicative of privacy enforcement and a license plate are detected, the imaging system may take appropriate action to protect privacy. Control and processing circuitry 16 may, for example, delete the frame of captured image data entirely. Alternatively, control and processing circuitry 16 may use blurring techniques to blur the entire captured image. In these cases, the image would be blurred so that the entire image is unrecognizable, thus sufficiently protecting the privacy of the vehicle of the image. In another embodiment, control and processing circuitry 16 may use blurring techniques to blur only the license plates present in the captured image. This may allow the rest of the image to be viewable while still maintaining the privacy of the subjects of the photograph or video. In yet another embodiment, control and processing circuitry 16 may overlay a solid color over the license plates in the captured image. Similar to blurring only the license plate in the image, this technique may allow the rest of the image to be viewable while still maintaining the privacy of the subjects of the photograph or video. In general, any suitable method of preventing license plates in the captured image from being recognized may be used to protect the privacy of the vehicles in the photograph.

At step 410, after taking action to protect privacy, the imaging system may insert an indicator. The indicator may explain that a privacy marker was detected in the originally captured image and that the image or portions of the image have been deleted or altered accordingly. In embodiments where the frame is deleted entirely, the indicator may include text that clarifies that the frame was deleted for privacy protection. In embodiments where the entire frame is blurred, the indicator may include text that clarifies that the entire frame was blurred for privacy protection. In embodiments where only the license plates in the photograph are altered, either through blurring techniques, a solid color overlay, or another technique, the indicator may include text that clarifies that the license plates in the photograph are being obscured for privacy protection. In certain embodiments, the indicator may be a symbol instead of text. Any suitable indicator may be used to convey the information to the user of the system. In certain embodiments, the original image data may also be thrown away at step 410. This ensures that the image data cannot be obtained and processed to violate the privacy of the subject in the image.

At step 412, the frame of captured image data may be processed by control and processing circuitry 16. This processing may convert the image data into an image suitable for use in a display.

At step 414, the processed frame of image data may be exported. For example, the image data may be output to a host-subsystem such as host-subsystem 20. Once at host-subsystem 20, system 100 may use input-output devices 22 such as a display to display the captured image. In frames where privacy enforcement was necessary, the display may display the altered frame with the indicator inserted at step 410.

FIG. 5 is a diagram of an illustrative optical marker for use in privacy request enforcement. As shown, optical marker 502 may include a first shape 504 and a second shape 506. The first and second shape may be adjacent (e.g., FIG. 5). In certain embodiments, the first and second shape may be touching or overlapping. In embodiments where the first and second shapes are separated by a distance (e.g., FIG. 5), the first and second shapes may be separated by less than one inch, less than two inches, less than 6 inches, less than 12 inches, or more than 12 inches. The use of only two shapes is purely illustrative. Any number of patterns or shapes may be used to form optical marker 502. One shape, two shapes, three or more shapes, five or more shapes, ten or more shapes, or another desired number of shapes may be used to form optical marker 502. Each shape may have a unique color scheme to make the optical marker easily identifiable. For example, shape 504 may be a rectangle with a first color 510 on the inside of the rectangle and a second color 508 on the outside of the rectangle. Shape 506 may be, for example, a circle with concentric rings of varying colors. In this example the innermost ring has a first color 512, two of the rings have a second color 514, and another ring has a third color 516. In both shapes 504 and 506, any number of colors may be used. For example, shapes 504 and 506 may be only one color, two colors, three colors, more than three colors, or more than five colors. In general, any pattern that is recognizable to an image sensor may be used to form optical marker 502. In certain embodiments, system 100 may have ultraviolet sensors or infrared sensors. In these embodiments, the optical marker need not be limited to patterns of visible light. The optical marker may, for example, contain ultraviolet light at varying wavelengths, infrared light at varying wavelengths, ultraviolet and infrared light, ultraviolet and visible light, or any other desired combination of light and wavelengths of light.

Figure 6:
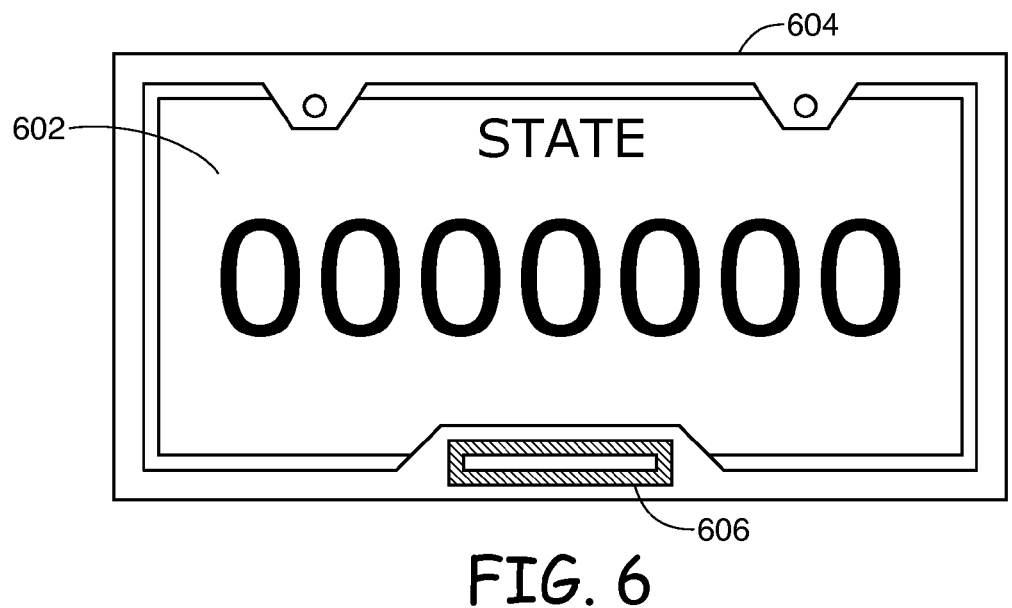
FIG. 6 is a diagram of an illustrative optical marker on a license plate for use in privacy request enforcement in accordance with an embodiment of the present invention.

FIG. 6 is a diagram of an illustrative optical marker on a license plate for use in privacy enforcement. License plate 602 may be secured to a vehicle with license plate frame 604. License plate frame 604 may include optical marker 606. The optical marker may be, for example, a rectangle with a first color on the inside of the rectangle and a second color on the outside of the rectangle. This example of an optical marker is purely illustrative. Optical marker 606 may be any pattern that is recognizable to an image sensor. In certain embodiments, license plate 602 may emit a temporal pattern of light to indicate a request for privacy.

In the example of FIG. 6, optical marker 606 is depicted as being located on license plate frame 604. This example is purely illustrated, and optical marker 606 may be located at any desired location. For example, optical marker may be located on the license plate or on any portion of the accompanying vehicle.

Figure 7:
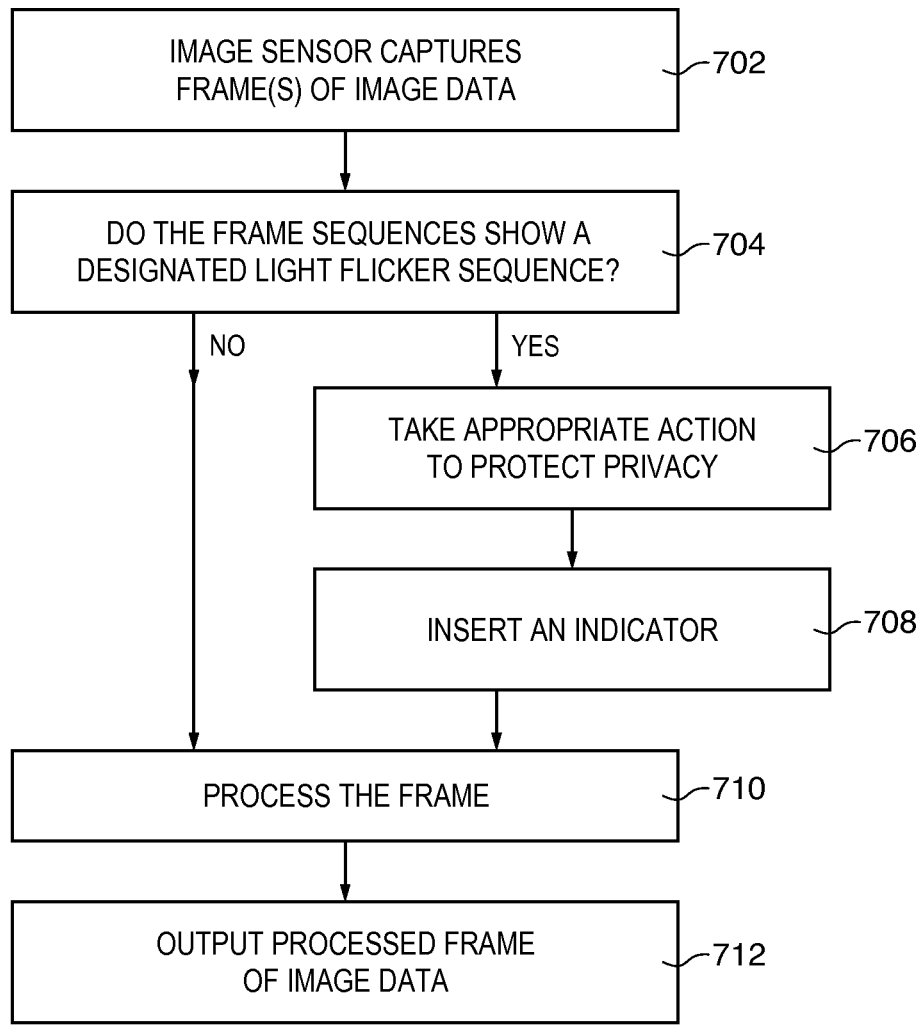
FIG. 7 is a flowchart of illustrative steps for enforcing privacy requests using a temporal pattern of emitted light in accordance with an embodiment of the present invention.

FIG. 7 is a flowchart of illustrative steps for enforcing a privacy request using a temporal pattern of emitted light. At step 702, an image sensor such as image sensor 14 may capture a frame or multiple frames of image data. In an illustrative example, image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 704, control and processing circuitry 16 may determine if a sequence of frames shows a designated light flicker sequence. Typically, alternating current (AC) in a particular country operates at a standard frequency throughout the country. This frequency may sometimes be referred to as the utility frequency. For example, alternating current in the United States has a utility frequency of 60 Hz. In one embodiment, to prevent photographs from being taken in a particular area, lighting may be used with a frequency of 120 Hz. This example is purely illustrative, and any pre-determined frequency may be used as the temporal pattern. In another example, lighting may operate at the utility frequency with a component added at a frequency different from the utility frequency. The unique frequency may be tunable so that the privacy request may be easily turned on and off. The imaging system may use the image sensor to determine that the ambient light has a frequency component of 120 Hz (instead of the usual 60 Hz), and take appropriate action to protect privacy in step 706. If the imaging system does not detect the designated light flicker sequence, the frames of image data may be processed at step 710. The unique frequency may alert the imaging system of the privacy protection without introducing visible artifacts to the area.

Using a designated light flicker sequence to protect privacy may be used in buildings or other areas where privacy is desired. For example, a hospital, museum, school, or other institution wishing to prevent unauthorized photographs may use lighting with the specified frequency component instead of lighting using only the utility frequency. This embodiment results in maintaining the privacy of the institution without any optical markers that could be seen by users in the institution. In certain embodiments, using lighting with a frequency component that is a multiple of the utility frequency (e.g., 120 Hz, or two times the utility frequency of the United States) may be desirable. For certain imaging systems, using light with a frequency component that is not a multiple of the utility frequency may lead to visible artifacts in the captured images. Therefore, using lighting with a frequency component that is a multiple of the utility frequency may limit unnecessary visual artifacts.

In the aforementioned embodiment, the designated light flicker sequence is described for visible light. However, other types of light may be used to achieve the same effect. For example, a temporal sequence of ultraviolet or infrared may be used to convey a desire for privacy to the imaging system. In these embodiments, the imaging system may include sensors capable of sensing ultraviolet or infrared light.

In certain embodiments, a temporal pattern of sound may be used instead of the temporal pattern of emitted light. For example, sound may be emitted at a predetermined frequency. System 100 may have microphones capable of recognizing the sound pattern and modify any captured images accordingly. In some cases, sound that is outside normal audible ranges for humans, such as infrasound and ultrasound, may be used. Infrasound and ultrasound patterns may notify the imaging system of a request for privacy without being audible to people in the area.

At step 706, after the designated light flicker sequence is detected, control and processing circuitry 16 may take appropriate action to protect privacy. Control and processing circuitry 16 may, for example, delete the frame of captured image data entirely. Alternatively, control and processing circuitry 16 may use blurring techniques to blur the captured image. In these cases, the image would be blurred so that the image is unrecognizable, thus sufficiently protecting the privacy of the subject of the image. In certain embodiments, the imaging system may use face recognition techniques and obscure only the faces present in the captured image.

At step 708, after taking action to protect privacy, control and processing circuitry 16 may insert an indicator. The indicator may explain that a privacy marker was detected in the originally captured image and that the image has been deleted or altered accordingly. In embodiments where the frame is deleted entirely, the indicator may include text that clarifies that the frame was deleted for privacy protection. In embodiments where the frame is blurred, the indicator may include text that clarifies that the frame was blurred for privacy protection. In certain embodiments, the indicator may be a symbol instead of text. Any suitable indicator may be used to convey the information to the user of the system. In certain embodiments, the original image data may also be thrown away at step 708. This ensures that the image data cannot be obtained and processed to violate the privacy of the subject in the image.

At step 710, the frame of captured image data may be processed by control and processing circuitry 16. This processing may convert the image data into an image suitable for use in a display.

At step 712, the processed frame of image data may be exported. For example, the image data may be output to a host-subsystem such as host-subsystem 20. Once at host-subsystem 20, system 100 may use input-output devices 22 such as a display to display the captured image. In frames where privacy enforcement was necessary, the display may display the altered frame with the indicator inserted at step 708.

Figure 8:
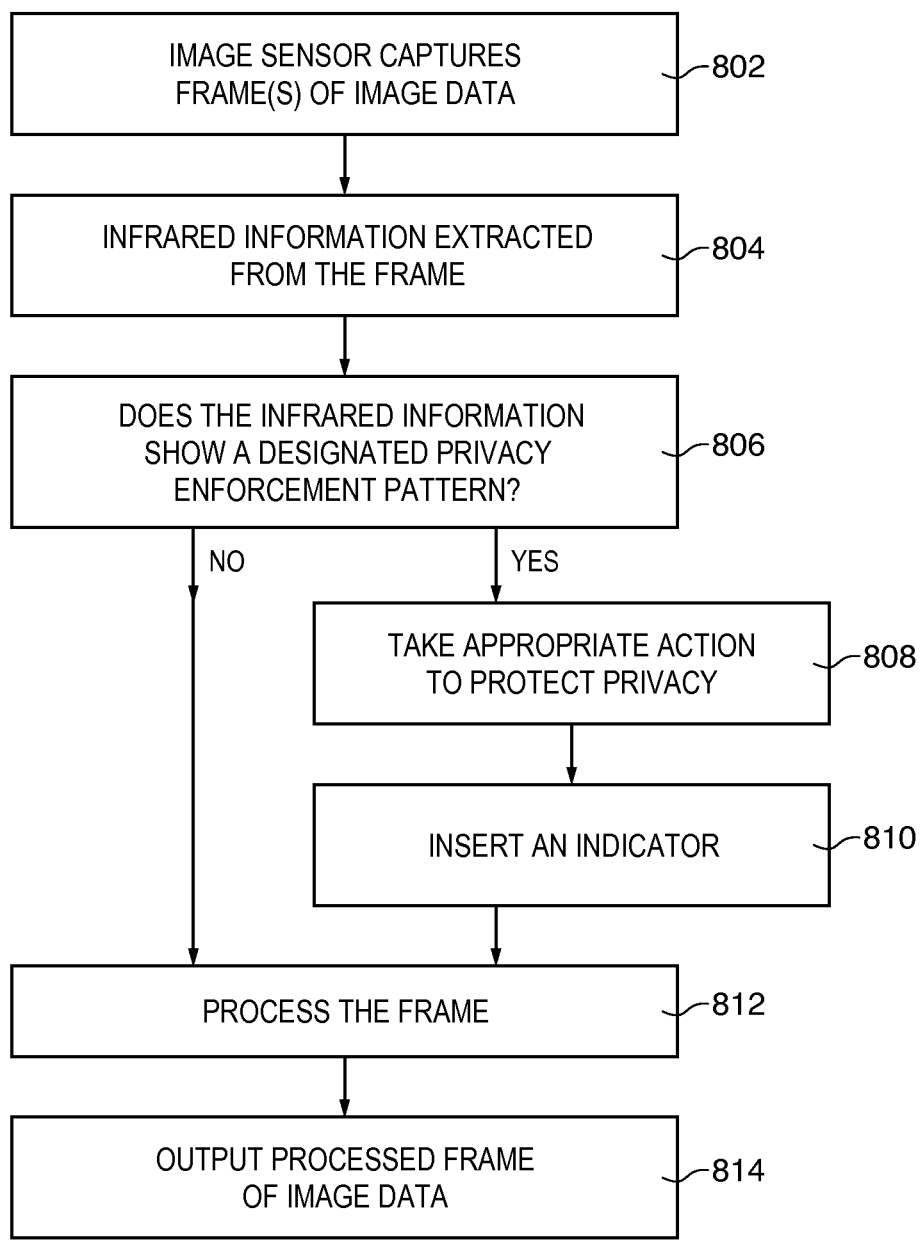
FIG. 8 is a flowchart of illustrative steps for enforcing privacy requests using a designated pattern of infrared light in accordance with an embodiment of the present invention.

FIG. 8 is a flowchart of illustrative steps for enforcing privacy requests using a designated pattern of infrared light. At step 802, an image sensor such as image sensor 14 may capture a frame or multiple frames of image data. In an illustrative example, image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16. Imaging system 10 may include an infrared sensor that captures infrared image data. In certain embodiments, image sensor 14 may capture infrared image data. At step 804, the infrared information captured by image sensor 14 may be extracted from the frame of captured image data.

At step 806, control and processing circuitry 16 may determine if the image captured by image sensor 14 contains a pre-determined pattern of infrared light indicating privacy enforcement. Control and processing circuitry 16 may analyze the image data to search for the pre-determined pattern before other image processing occurs. If pattern indicative of privacy enforcement is determined to be present, the image data may be processed at step 812. If a pre-determined pattern of infrared light indicating privacy enforcement is determined to be present, appropriate action may be taken to protect privacy at step 808.

The pre-determined pattern of infrared light may be any shape or size. The pattern may include sections with different infrared wavelengths. The use of an infrared pattern may be desirable as privacy may be enforced without using a pattern that is visible to the human eye.

At step 808, after the pre-determined pattern of infrared light is detected, control and processing circuitry 16 may take appropriate action to protect privacy. Control and processing circuitry 16 may, for example, delete the frame of captured image data entirely. Alternatively, control and processing circuitry 16 may use blurring techniques to blur the captured image. In these cases, the image would be blurred so that the image is unrecognizable, thus sufficiently protecting the privacy of the subject of the image.

At step 810, after taking action to protect privacy, control and processing circuitry 16 may insert an indicator. The indicator may explain that a privacy marker was detected in the originally captured image and that the image has been deleted or altered accordingly. In embodiments where the frame is deleted entirely, the indicator may include text that clarifies that the frame was deleted for privacy protection. In embodiments where the frame is blurred, the indicator may include text that clarifies that the frame was blurred for privacy protection. In certain embodiments, the indicator may be a symbol instead of text. Any suitable indicator may be used to convey the information to the user of the system. In certain embodiments, the original image data may also be thrown away at step 810. This ensures that the image data cannot be obtained and processed to violate the privacy of the subject in the image.

At step 812, the frame of captured image data may be processed by control and processing circuitry 16. This processing may convert the image data into an image suitable for use in a display.

At step 814, the processed frame of image data may be exported. For example, the image data may be output to a host-subsystem such as host-subsystem 20. Once at host-subsystem 20, system 100 may use input-output devices 22 such as a display to display the captured image. In frames where privacy enforcement was necessary, the display may display the altered frame with the indicator inserted at step 810.

Figure 9:
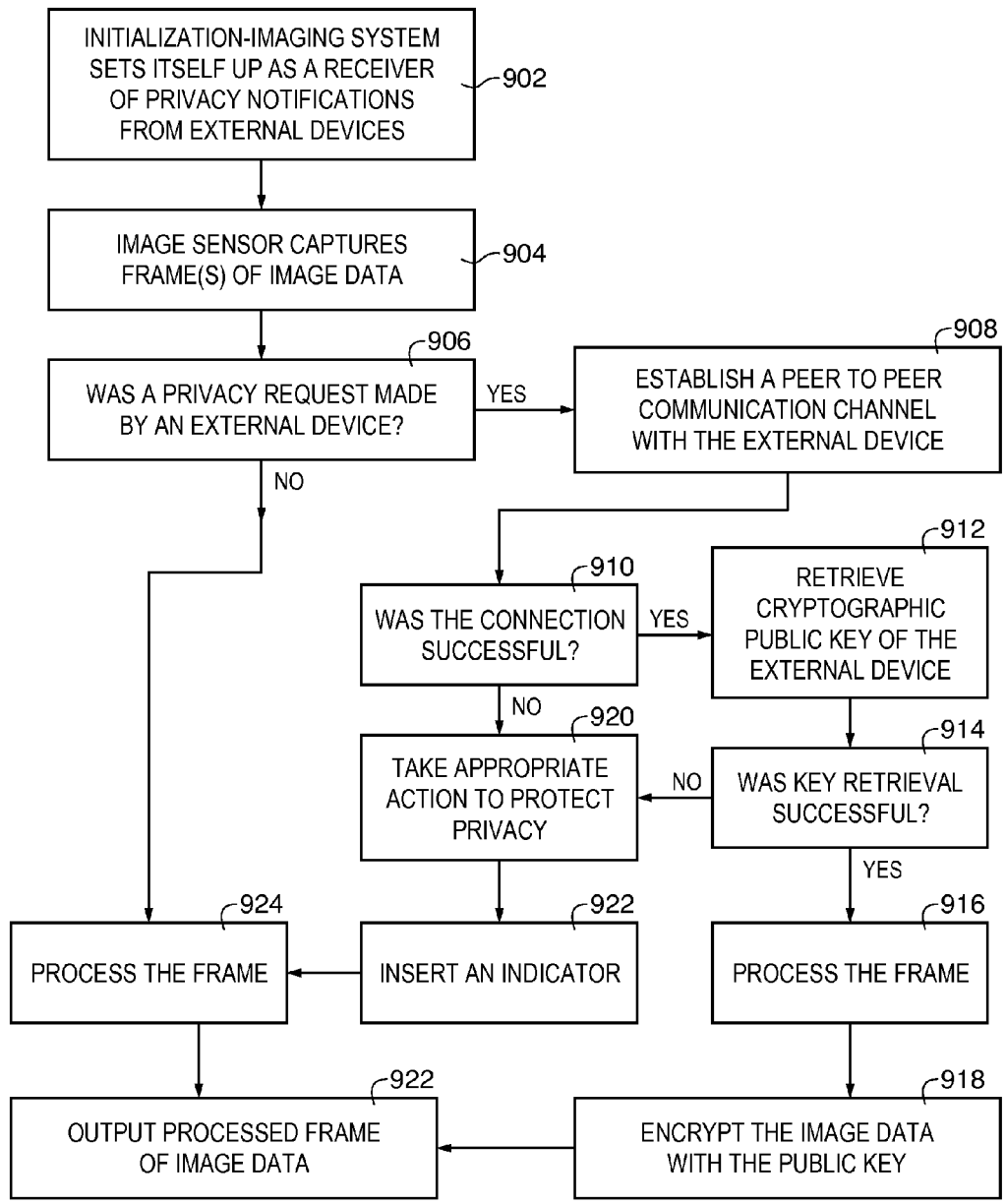
FIG. 9 is a flowchart of illustrative steps for enforcing privacy requests using frame encryption in accordance with an embodiment of the present invention.

FIG. 9 is a flowchart of illustrative steps for enforcing privacy requests using frame encryption. At step 902, the imaging system may initialize a server to receive privacy notifications from external devices. Once set up to receive notifications, the image sensor may capture a frame or multiple frames of image data at step 904. Image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 906, the imaging system determines if a privacy request has been made by an external device. If the imaging system receives a request for privacy, the system may move to step 908. In certain embodiments, the imaging system may receive location data from the external device making the request for privacy. In these embodiments, the imaging system may proceed to step 924 and process the captured image data if the request for privacy came from an external device located more than a given distance away. For example, the imaging system may only heed privacy requests from external devices less than 10 feet away, less than 100 feet away, less than 1,000 feet away, or any other suitable distance. In these embodiments, the imaging system may proceed to step 908 if the privacy requesting external device is closer than the pre-determined threshold distance.

If no privacy request is received at step 906, the imaging system may proceed to step 924 and process the frame of captured image data. This processing may convert the image data into an image suitable for use in a display.

At step 908, after receiving a privacy request from an external device, the imaging system may attempt to establish a peer to peer communication channel with the external device. In a peer to peer communication channel, either the system containing the imaging system or the external device may initiate a communication session.

At step 910, the imaging system determines if the attempt to establish the peer to peer communication channel was successful. If the connection was established successfully, the imaging system may proceed to step 912. If the connection was not established successfully, the imaging system may take appropriate action to protect privacy at step 920.

At step 912, the imaging system may attempt to retrieve the cryptographic public key of the external device. The cryptographic public key may be stored in the external device. For example, if the external device was a cellular telephone, the cellular telephone may store the cryptographic public key. In other embodiments, system 100 may retrieve the public key of the external device from a network such as a cloud-based network. At step 914, system 100 may determine if the cryptographic public key was successfully retrieved. If the key was not successfully retrieved, the imaging system may take appropriate action to protect privacy at step 920. If the public key was successfully retrieved, the imaging system may proceed to step 916.

At step 916, the frame of captured image data may be processed by control and processing circuitry 16. This processing may convert the image data into an image suitable for use in a display.

At step 918, the processed image data may be encrypted using the cryptographic public key retrieved in step 912. The data may be encrypted so that only the private key of the external device with the privacy notification may decrypt the image data.

At step 926, the now encrypted image data is output from control and processing circuitry 16. The encrypted data may only be decrypted by the private key of the external device. In this way, the privacy of the operator of the external device is ensured as they will be the only one able to decrypt and access the image data. In certain embodiments, the external device may have an option to decrypt the image data so that only the external device has access to the data. In another embodiment, the external device may have an option to decrypt the image data so that only the external device and the device that took the photograph (system 100) have access to the image data. In yet another embodiment, the external device may have the option to decrypt the image data so that the data is public and any other device may access the image data and view the captured image.

If either the attempt to establish a peer to peer communication channel with the external device in step 908 or the attempt to retrieve the public key of the external device in step 912 is unsuccessful, the imaging system will take appropriate action to protect privacy in step 920. Control and processing circuitry 16 may, for example, delete the frame of captured image data entirely. Alternatively, control and processing circuitry 16 may use blurring techniques to blur the captured image. In these cases, the image would be blurred so that the image is unrecognizable, thus sufficiently protecting the privacy of the subject of the image. In certain embodiments, the imaging system may use face recognition software and obscure only the faces present in the captured image.

At step 922, after taking action to protect privacy, control and processing circuitry 16 may insert an indicator. The indicator may explain that an external device in the area has made a privacy request and that the image has been deleted or altered accordingly. In embodiments where the frame is deleted entirely, the indicator may include text that clarifies that the frame was deleted for privacy protection. In embodiments where the frame is blurred, the indicator may include text that clarifies that the frame or parts of the frame were blurred for privacy protection. In certain embodiments, the indicator may be a symbol instead of text. Any suitable indicator may be used to convey the information to the user of the system. In certain embodiments, the original image data may also be thrown away at step 922. This ensures that the image data cannot be obtained and processed to violate the privacy of the subject in the image. After inserting an indicator, the imaging system may process the frame at step 924.

Figure 10:
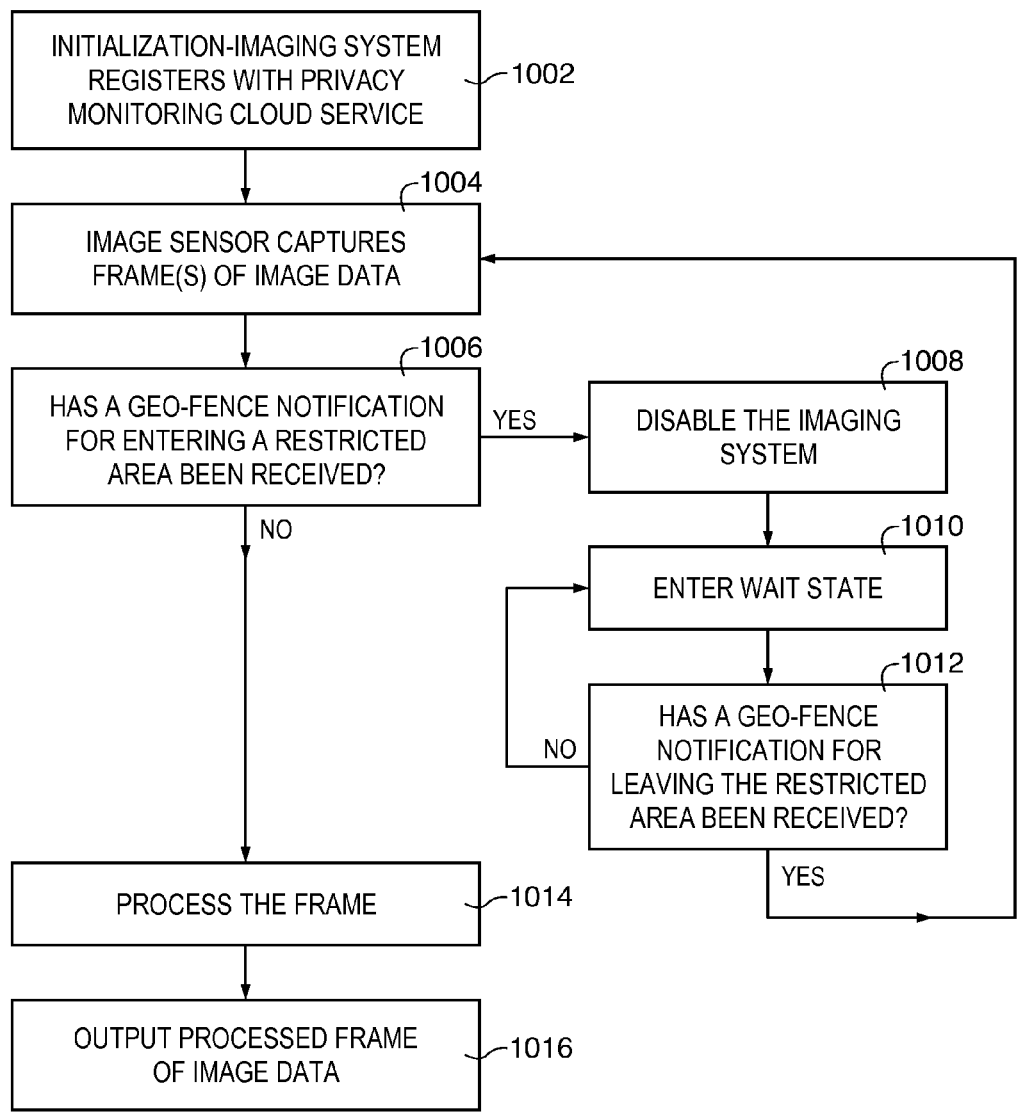
FIG. 10 is a flowchart of illustrative steps for enforcing privacy requests using a geo-fence in accordance with an embodiment of the present invention.

FIG. 10 is a flowchart of illustrative steps for enforcing privacy using a geo-fence. At step 1002, the imaging system may register with a privacy monitoring cloud service. In some cases, the imaging system may fail to register with the cloud service. In these cases, the imaging system may optionally disable the imaging system to prevent any image data from being captured. After successful registration, the image sensor may capture a frame or multiple frames of image data at step 1004. Image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 1006, the system may determine if a geo-fence notification for entering a restricted area has been received. A geo-fence notification may be sent to an electronic device (e.g., system 100) if the device enters a predetermined area. The electronic device may use nearby Wi-Fi connections, its position relative to nearby cellular towers, any transmitted radio-frequency signal, and global positioning system (GPS) data to regularly determine its position. If the position is determined to be in a geo-fence area, the device may receive a geo-fence notification. If a notification has been received, the imaging system may proceed to step 1008. If no notification has been received, the imaging system may proceed to step 1014 for image processing.

At step 1008, the imaging system is disabled and prevented from capturing image data. In some embodiments, the system may display a notification that the system is in an area that has restricted photographs and that the imaging system has been disabled accordingly. The imaging system then enters a wait state at 1010. The system periodically determines if a geo-fence notification for leaving the restricted area has been received. If no notification is received, the system returns to the wait state at step 1010. If a notification is received, the imaging system is allowed to function normally and returns to step 1004 to capture image data.

At step 1016, the processed frame of image data may be exported. For example, the image data may be output to a host-subsystem such as host-subsystem 20. Once at host-subsystem 20, system 100 may use input-output devices 22 such as a display to display the captured image.

Figure 11:
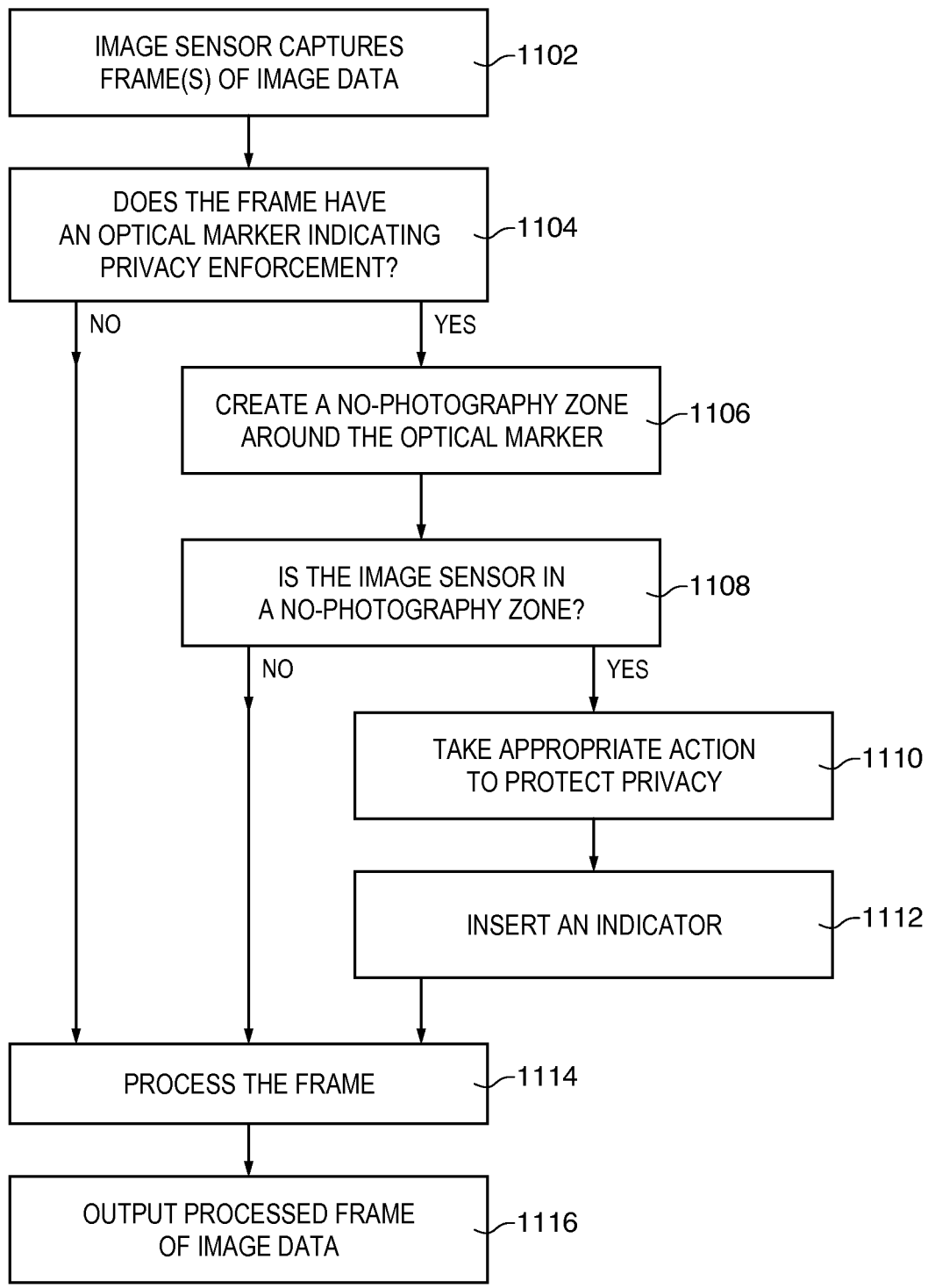
FIG. 11 is a flowchart of illustrative steps for enforcing privacy requests using an optical marker and a no-photography zone in accordance with an embodiment of the present invention.

FIG. 11 is a flowchart of illustrative steps for enforcing privacy using an optical marker and a no-photography zone. At step 1102, an image sensor such as image sensor 14 may capture a frame or multiple frames of image data. Image sensor 14 may be directed by a user to take a photograph, in which one frame of image data may be captured. In cases where the image sensor is being used to capture video, multiple frames of image data may be continuously captured. After capturing the image data, the image data may be provided to control and processing circuitry such as control and processing circuitry 16.

At step 1104, control and processing circuitry 16 may determine if the image captured by image sensor 14 contains an optical marker indicating privacy enforcement. Control and processing circuitry 16 may analyze the image data to search for an optical marker before other image processing occurs. If no optical marker indicative of privacy enforcement is determined to be present, the image data may be processed at step 1114. If an optical marker indicative of privacy enforcement is determined to be present, the system may proceed to step 1106.

At step 1106, system 100 may create a no-photography zone around the optical marker. For example, after detecting the optical marker in step 1104, system 100 may create a zone of a certain radius around the optical marker. System 100 may create a no-photography zone with a radius of 10 or less feet, 10 or more feet, 25 or more feet, 100 or more feet, or any other desired distance. The previous example of the no-photography zone being a circle with a radius is purely illustrative. The no-photography zone may have any desired shape or size. For example, the no-photography zone may correspond to an irregularly shaped building or institution. System 100 may establish the no-photography zone using any suitable method. The no-photography zone may, for example, be established using any combination of inertial sensors in the system, connections to wireless local area networks (WLANs), cloud-based networks, connections to nearby cellular towers, any transmitted radio-frequency signal, or any other desired method.

At step 1108, the system may determine if the imaging system is in the no-photography zone. The system may use any combination of GPS technology, inertial sensors, the strength of a connection to a particular network, or any other desired method to determine if the imaging system is in the no-photography zone. If the system is determined not to be in a no-photography zone, the system may proceed to step 1114. If the system is in a no-photography zone, appropriate action to protect privacy may be taken at step 1110.

At step 1110, control and processing circuitry 16 may, for example, delete the frame of captured image data entirely. Alternatively, control and processing circuitry 16 may use blurring techniques to blur the captured image. In these cases, the image would be blurred so that the image is unrecognizable, thus sufficiently protecting the privacy of the subject of the image. In certain embodiments, the imaging system may use face recognition techniques and obscure only the faces present in the captured image.

At step 1112, after taking appropriate action to protect privacy, control and processing circuitry 16 may insert an indicator. The indicator may explain that a privacy marker was detected in the originally captured image and that the image has been deleted or altered accordingly. In embodiments where the frame is deleted entirely, the indicator may include text that clarifies that the frame was deleted for privacy protection. In embodiments where the frame is blurred, the indicator may include text that clarifies that the frame was blurred for privacy protection. In certain embodiments, the indicator may be a symbol instead of text. Any suitable indicator may be used to convey the information to the user of the system. In certain embodiments, the original image data may also be thrown away at step 1112. This ensures that the image data cannot be obtained and processed to violate the privacy of the subject in the image. After inserting an indicator, the imaging system may process the frame at step 1114.

At step 1114, the frame of captured image data may be processed by control and processing circuitry 16. This processing may convert the image data into an image suitable for use in a display.

At step 1116, the processed frame of image data may be exported. For example, the image data may be output to a host-subsystem such as host-subsystem 20. Once at host-subsystem 20, system 100 may use input-output devices 22 such as a display to display the captured image. In frames where privacy enforcement was necessary, the display may display the altered frame with the indicator inserted at step 1112.

Various embodiments have been described illustrating an imaging system and a method of operating an imaging system. An imaging system may include an image sensor and control and processing circuitry. The image sensor may capture a frame of image data. After capturing the image data, control and processing circuitry may detect an optical marker in the frame of image data. The optical marker may represent a privacy request. In response to detecting the optical marker in the frame of image data, the frame of image data may be modified.

After modifying the frame of image data, an indicator may be inserted that will show that the frame of image data has been modified when the frame of image data is displayed. Modifying the frame of image data may include deleting the frame of image data or blurring the entire frame of image data. In response to detecting the optical marker in the frame of image data, a face may be detected in the frame of image data. After detecting the face in the image data, the frame may be modified so that only the face is blurred or overlaid with a solid color. The optical marker may be detected before any image processing occurs. In some embodiments, a plurality of faces may be detected in response to detecting the optical marker in the frame of image data. At least one face of the plurality of faces may be associated with the optical marker. In response to detecting the plurality of faces, the plurality of faces may be obscured with the rest of the image remaining unobscured. Alternatively, in response to detecting the plurality of faces, only the face or faces associated with the optical marker may be obscured.

After detecting the optical marker in the frame of image data, a license plate may be detected in the frame of image data. In response to detecting the license plate, the frame of image data may be modified so that only the license plate is obscured.

After detecting the optical marker, a no-photography zone may be created around the optical marker. The imaging system may be determined to be in the no-photography zone before the frame of image data is modified.

In various embodiments of the invention, control and processing circuitry may be used to detect a temporal pattern of emitted light in captured image data. The temporal pattern of emitted light may represent a privacy request. The frame of image data may be modified in response to detecting the temporal pattern of emitted light. The temporal pattern of emitted light may be visible light emitted with a frequency component that is a multiple of a utility frequency. The temporal pattern of emitted light may be electromagnetic radiation outside the visible range.

In various embodiments of the invention, it may be determined that the imaging system entered a restricted area. In response, the imaging system may be disabled so that no image data may be captured. After disabling the imaging system, it may be determined that the imaging system has left the restricted area. In response, the imaging system may be returned to a regular operating mode where image data may be captured. Determining the imaging system has entered the restricted area may include receiving a geo-fence notification that the imaging system has entered the restricted area. Determining the imaging system has left the restricted area may include receiving a geo-fence notification that the imaging system has left the restricted area.

The foregoing is merely illustrative of the principles of this invention which can be practiced in other embodiments.

What is claimed is:

1. A method of operating an imaging system, wherein the imaging system comprises an image sensor and control and processing circuitry, the method comprising:
   with the image sensor, capturing a frame of image data;
   with the control and processing circuitry, detecting an optical marker in the frame of image data, wherein the optical marker represents a privacy request;
   in response to detecting the optical marker in the frame of image data, modifying the frame of image data; and
   in response to detecting the optical marker in the frame of image data, detecting a license plate present in the frame of image data.

2. The method defined in claim 1, further comprising:
   after modifying the frame of image data, inserting an indicator that will show that the frame of image data has been modified when the frame of image data is displayed.

3. The method defined in claim 1, wherein modifying the frame of image data comprises deleting the frame of image data.

4. The method defined in claim 1, wherein modifying the frame of image data comprises blurring the entire frame of image data.

5. The method defined in claim 1, wherein detecting the optical marker in the frame of image data comprises detecting the optical marker in the frame of image data before any image processing occurs.

6. The method defined in claim 1, further comprising:
   in response to detecting the license plate present in the frame of image data, modifying the frame of image data so that the license plate is obscured.

7. The method defined in claim 6, wherein modifying the frame of image data so that the license plate is obscured comprises modifying the frame of image data so that only the license plate is obscured.

8. A method of operating an imaging system, wherein the imaging system comprises an image sensor and control and processing circuitry, the method comprising:
   with the image sensor, capturing a frame of image data;
   with the control and processing circuitry, detecting an optical marker in the frame of image data, wherein the optical marker represents a privacy request;
   in response to detecting the optical marker in the frame of image data, modifying the frame of image data; and
   in response to detecting the optical marker in the frame of image data, detecting a face in the frame of image data.

9. The method defined in claim 8, further comprising:
   in response to detecting the face in the frame of image data, modifying the frame of image data so that only the face is blurred.

10. The method defined in claim 8, further comprising:
    in response to detecting the face in the frame of image data, modifying the frame of image data so that a solid cover is overlaid on only the face.

11. The method defined in claim 8, further comprising:
    detecting a plurality of additional faces in the frame of image data, wherein at least one face of the plurality of additional faces is associated with the optical marker.

12. The method defined in claim 11, further comprising:
    in response to detecting the plurality of additional faces, obscuring the plurality of faces.

13. The method defined in claim 11, further comprising:
    in response to detecting the additional plurality of faces, obscuring only the at least one face.

14. A method of operating an imaging system, wherein the imaging system comprises an image sensor and control and processing circuitry, the method comprising:
    with the image sensor, capturing image data;
    with the control and processing circuitry, detecting a temporal pattern of emitted light in the captured image data, wherein the temporal pattern of emitted light represents a privacy request, and wherein the temporal pattern of emitted light comprises a pattern of emitted light where light is alternately emitted for first time periods and not emitted for second time periods; and
    in response to detecting the temporal pattern of emitted light in the captured image data, modifying the image data.

15. The method defined in claim 14, wherein modifying the image data comprises deleting the image data.

16. The method defined in claim 14, wherein modifying the image data comprises blurring at least a portion of the image data.

17. The method defined in claim 14, wherein the temporal pattern of emitted light comprises visible light emitted with a frequency component that is a multiple of a utility frequency.

18. The method defined in claim 14, wherein the temporal pattern of emitted light comprises a temporal pattern of electromagnetic radiation outside the visible range.

19. The method defined in claim 14, wherein the temporal pattern of emitted light comprises a pattern of emitted visible light where visible light is alternately emitted for first time periods and not emitted for second time periods.

20. The method defined in claim 14, wherein the temporal pattern of emitted light comprises visible light emitted with a frequency that is a multiple of 60 hertz.

21. The method defined in claim 20, wherein the multiple is not equal to one.

* * * * *